United States Patent [19]
Fujiu et al.

[11] Patent Number: 6,099,036
[45] Date of Patent: Aug. 8, 2000

[54] INTERMEDIATE SHAFT APPARATUS OF STEERING SHAFT ASSEMBLY

[75] Inventors: Isao Fujiu; Toshihiko Aoyama; Masazumi Nagasawa, all of Kiryu, Japan

[73] Assignee: Kabushiki Kaisha Yamada Seisakusho, Gunma-ken, Japan

[21] Appl. No.: 08/896,957

[22] Filed: Jul. 18, 1997

[30] Foreign Application Priority Data

Jul. 19, 1996 [JP] Japan ..................................... 8-191048

[51] Int. Cl.[7] .............................. B62D 1/19; B62D 1/16; F16C 3/03
[52] U.S. Cl. ............................ 280/777; 74/492; 464/162
[58] Field of Search .............................. 280/777; 74/492; 464/162, 179; 188/371, 377

[56] References Cited

U.S. PATENT DOCUMENTS

| | | | |
|---|---|---|---|
| 4,892,002 | 1/1990 | Groat | 74/492 |
| 5,228,720 | 7/1993 | Sato et al. | 280/777 |
| 5,580,314 | 12/1996 | Moriyama et al. | 464/162 |
| 5,640,884 | 6/1997 | Fujiu et al. | 74/492 |
| 5,791,686 | 8/1998 | Moriyama | 280/777 |

FOREIGN PATENT DOCUMENTS

| | | |
|---|---|---|
| 1-73079 | 5/1989 | Japan . |
| 3-4031 | 1/1991 | Japan . |
| 6-329033 | 11/1994 | Japan . |

*Primary Examiner*—J. J. Swann
*Assistant Examiner*—F. Zeender
*Attorney, Agent, or Firm*—Lowe Hauptman Gopstein Gilman & Berner

[57] ABSTRACT

An intermediate shaft apparatus of a steering shaft assembly includes: an input shaft; a coupling shaft fixed to the input shaft in a circumferential direction and arranged to be slidable relative to the input shaft in an axial direction only during application of an impact thereto; an output shaft fixed to the coupling shaft in the circumferential direction and arranged to be slidable in the axial direction; and a buffer joint fitted at an axial end portion of the output shaft and formed by coupling an output-side yoke member and a cup member via an elastic member, wherein the output shaft and the cup member are provided with a penetrating portion through which the coupling shaft is capable of penetrating in the axial direction.

2 Claims, 11 Drawing Sheets

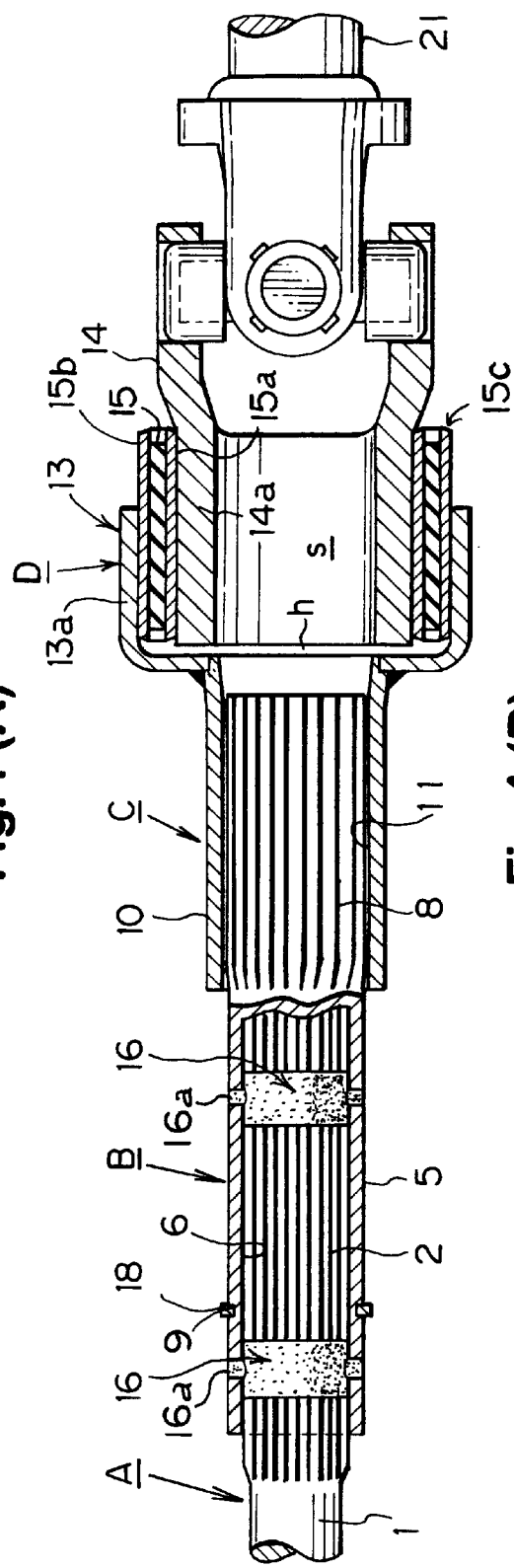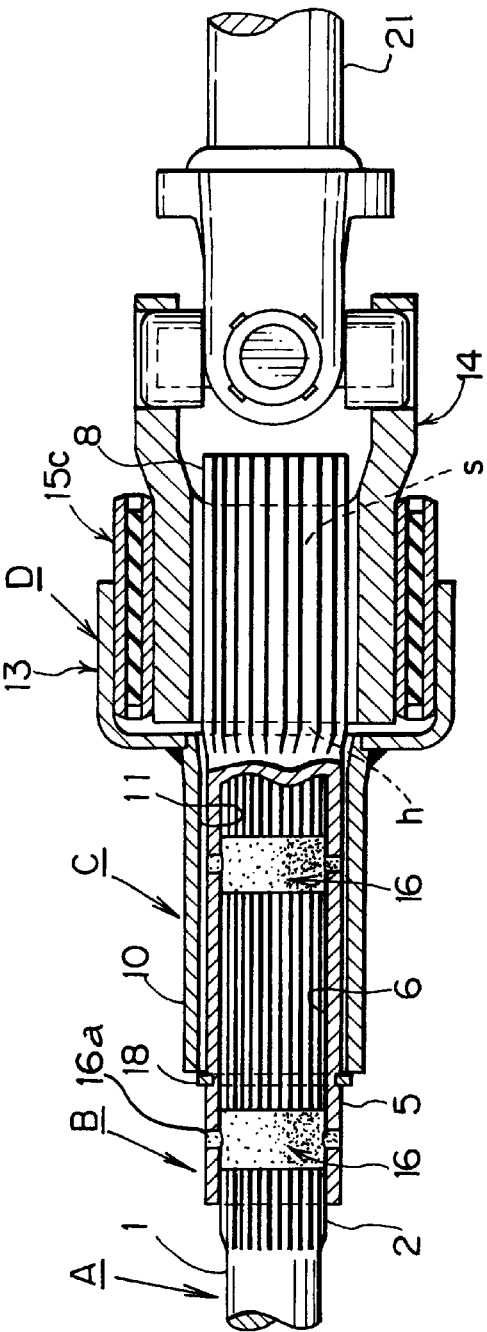
Fig.4 (A)
Fig.4 (B)

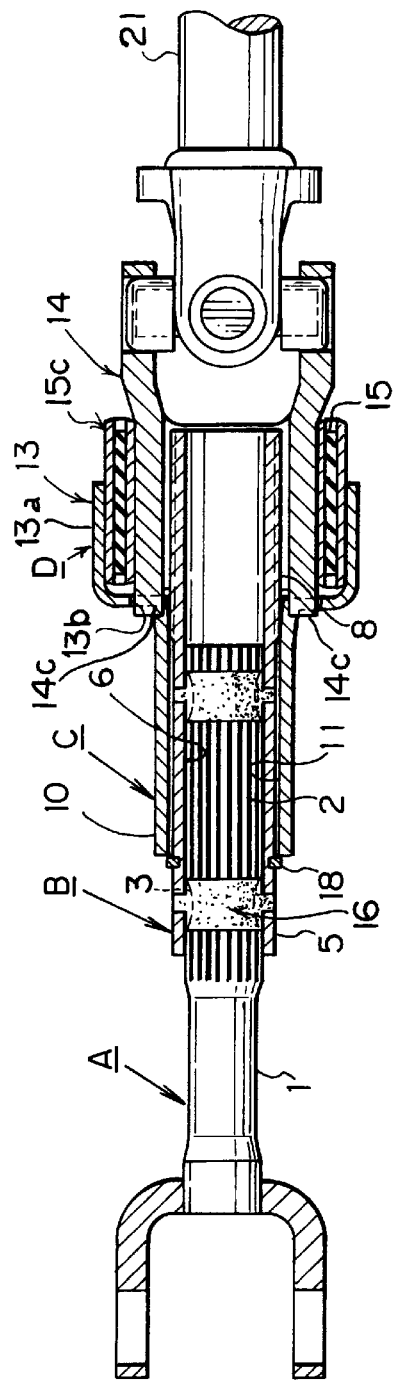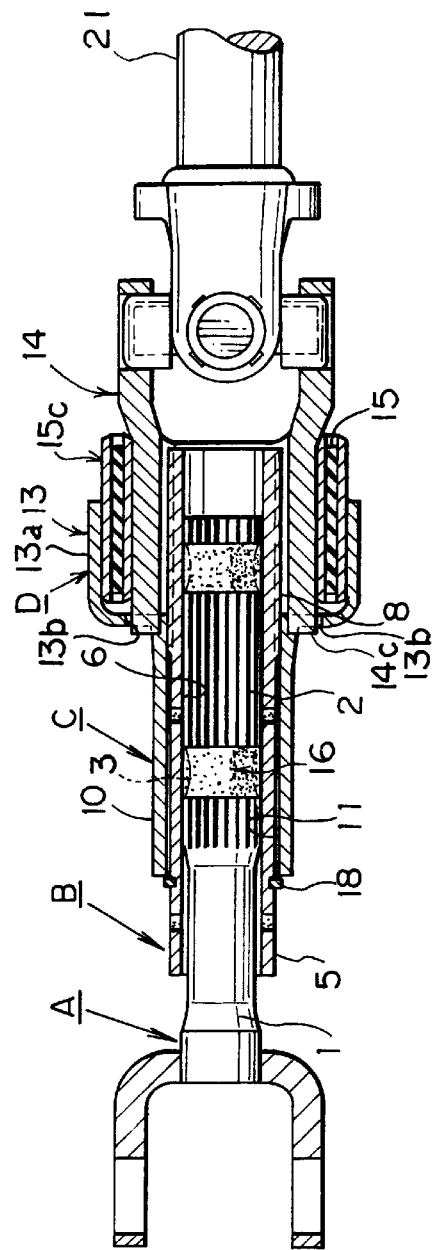
Fig.5 (A)
Fig.5 (B)

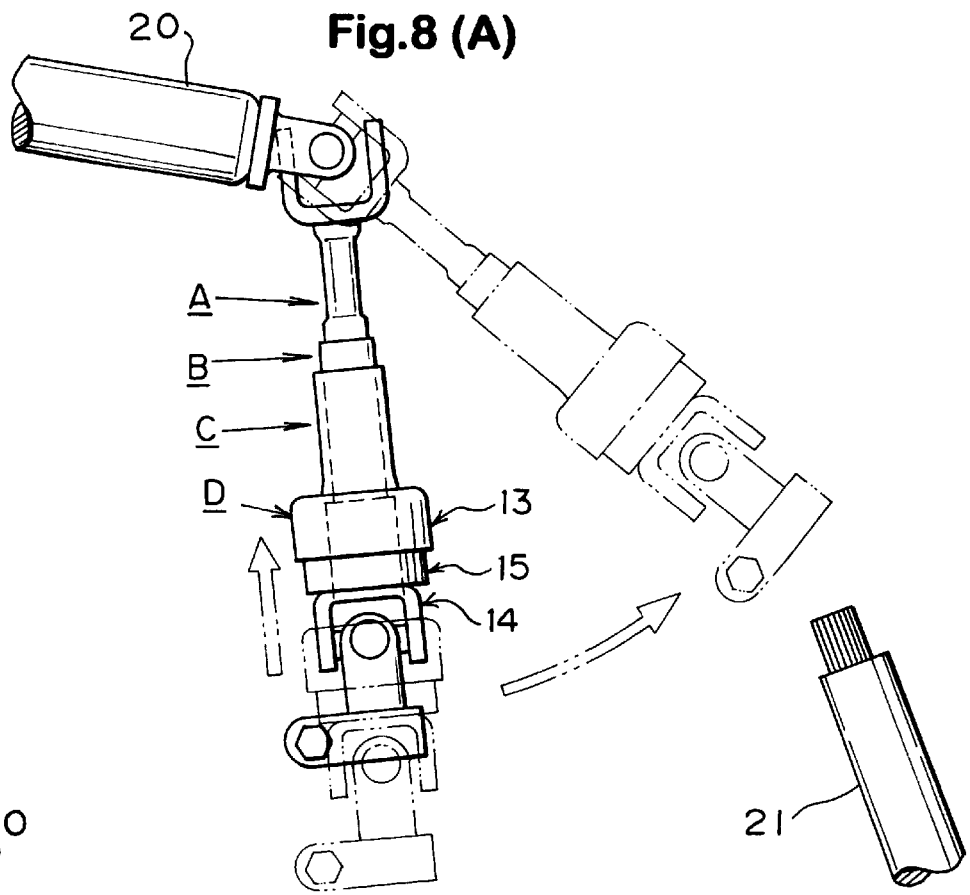
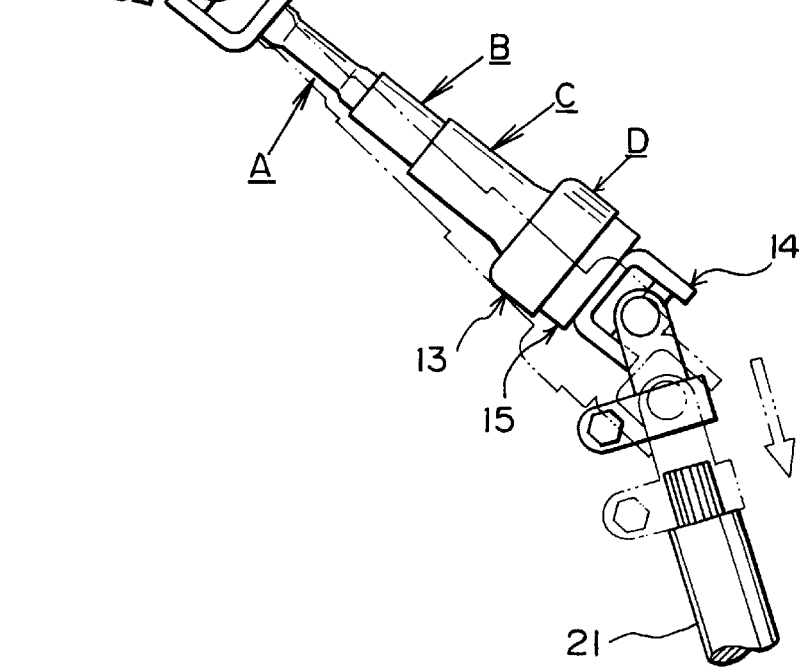
Fig.8 (A)
Fig.8 (B)

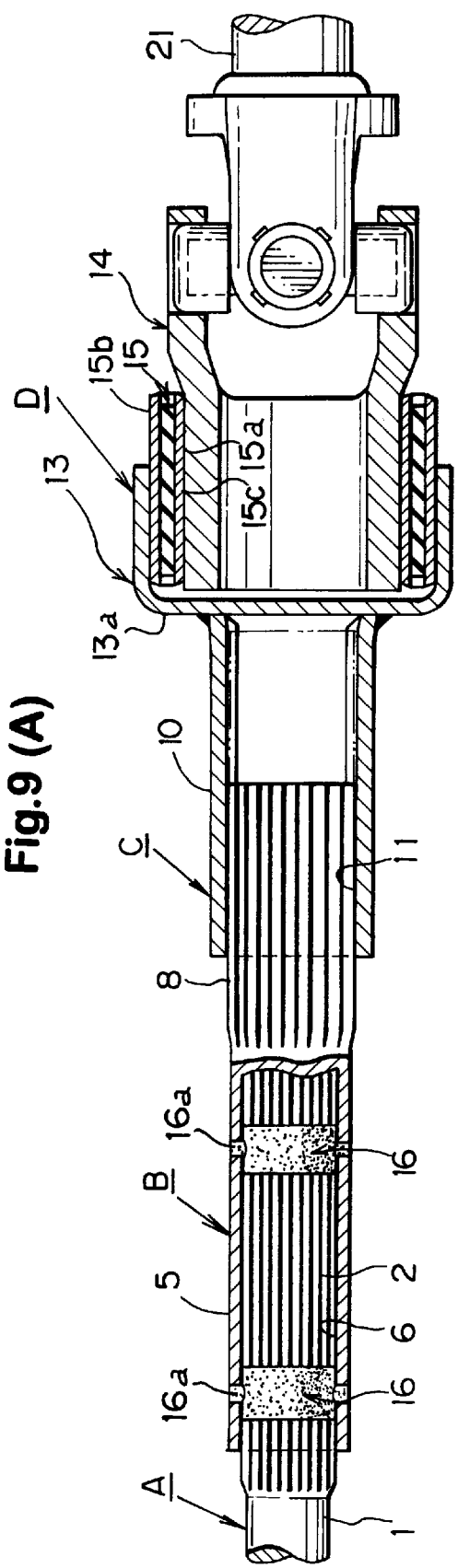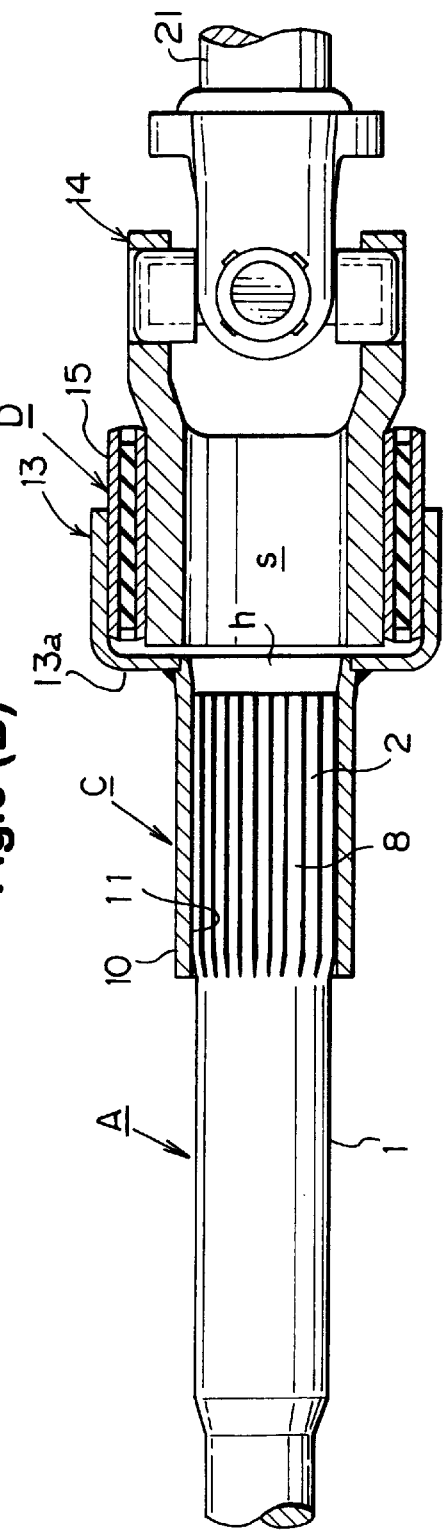
Fig.9 (A)
Fig.9 (B)

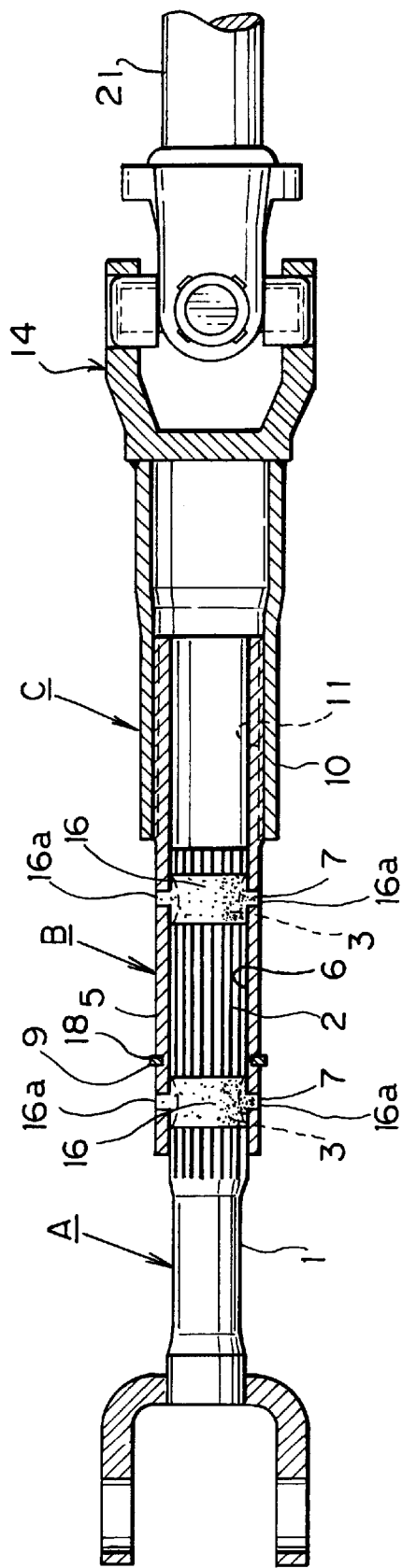

INTERMEDIATE SHAFT APPARATUS OF STEERING SHAFT ASSEMBLY

BACKGROUND OF THE INVENTION

1. Field of the Invention

The present invention relates to an intermediate shaft apparatus of a steering shaft assembly which, although compact, is capable of enlarging its contractible range when an impact is applied thereto, and which facilitates the operation of assembling the intermediate shaft apparatus onto relevant components of a vehicle body and is capable of improving the work efficiency.

2. Description of the Related Art

As a general structure of a steering apparatus, a contractible intermediate shaft is provided between a steering wheel shaft and a steering gear box.

As a contracting structure of the intermediate shaft, various structures are known. As a specific example, as disclosed in Japanese Utility Model Application Laid-Open No. 73079/1989, a structure is known in which, in an intermediate shaft having a plurality of shafts arranged in a multi-stage (telescopic) structure in an axial direction, the shafts are arranged to be slidable only in the axial direction, and the respective shafts are fixed to each other by means of injection-molded or resin-molded portions.

When a fixed impact load or more is applied to the intermediate shaft in the axial direction, fixing portions formed of the injection-molded or resin-molded portions are fractured, allowing the intermediate shaft to be contractible in the axial direction.

With the above-described structure, it is possible to obtain a large stroke for absorption of the impact in the intermediate shaft. However, with the above-described intermediate shaft of the multi-stage type, since the respective coupling portions are fixed by the resin-molded portions in advance, the intermediate shaft must be assembled onto joints of a vehicle body in a state in which the distance between the joints for the intermediate shaft is fixed.

For this reason, in a case where the assembling space between the joints of the vehicle body for mounting the intermediate shaft is narrow and does not have leeway, there is a possibility that the assembling efficiency becomes poor and the assembling is made difficult.

Further, in a case where an attempt is made to mount to the contractible intermediate shaft of the above-described multi-stage type in combination with an elastic shaft coupling, since the portion of the elastic shaft coupling is added, the axial length becomes further elongated, which further aggravates the assembling efficiency, or causes the combination with the elastic shaft coupling to be abandoned.

SUMMARY OF THE INVENTION

In view of the above-described circumstances, it is an object of the present invention to provide an intermediate shaft apparatus of a steering shaft assembly which, although compact, is capable of enlarging its contractible range when an impact is applied thereto, and which facilitates the operation of assembling the intermediate shaft apparatus onto relevant components of a vehicle body and is capable of improving the work efficiency.

To this end, in accordance with a first aspect of the present invention, there is provided an intermediate shaft apparatus of a steering shaft assembly, comprising: an input shaft; a coupling shaft fixed to the input shaft in a circumferential direction and arranged to be slidable relative to the input shaft in an axial direction only during application of an impact thereto; an output shaft fixed to the coupling shaft in the circumferential direction and arranged to be slidable in the axial direction; and an output-side yoke member provided at an axial end portion of the output shaft.

In accordance with a second aspect of the present invention, there is provided an intermediate shaft apparatus of a steering shaft assembly, comprising: an input shaft; a coupling shaft fixed to the input shaft in a axial direction via a resin-injected fixing member and arranged to be slidable relative to the input shaft in the axial direction only during application of an impact thereto; an output shaft fixed to the coupling shaft by means of friction derived from fitting together of shafts, the output shaft being arranged to be slidable in the axial direction; and an output-side yoke member provided at an axial end portion of the output shaft.

In accordance with a third aspect of the present invention, there is provided an intermediate shaft apparatus of a steering shaft assembly, comprising: an input shaft; an output shaft fixed to the input shaft in a circumferential direction and arranged to be slidable in an axial direction relative to the input shaft; and a buffer joint fitted at an axial end portion of the output shaft and formed by coupling an output-side yoke member and a cup member via an elastic member, wherein the output shaft and the cup member are provided with a penetrating portion through which the input shaft is capable of penetrating in the axial direction.

In accordance with a fourth aspect of the present invention, there is provided an intermediate shaft apparatus of a steering shaft assembly, comprising: an input shaft;
  a coupling shaft fixed to the input shaft in a circumferential direction and arranged to be slidable relative to the input shaft in an axial direction only during application of an impact thereto; an output shaft fixed to the coupling shaft in the circumferential direction and arranged to be slidable in the axial direction; and a buffer joint fitted at an axial end portion of the output shaft and formed by coupling an output-side yoke member and a cup member via an elastic member.

In accordance with a fifth aspect of the present invention, there is provided an intermediate shaft apparatus of a steering shaft assembly, comprising: an input shaft; a coupling shaft fixed to the input shaft in a circumferential direction and arranged to be slidable relative to the input shaft in an axial direction only during application of an impact thereto; an output shaft fixed to the coupling shaft in the circumferential direction and arranged to be slidable in the axial direction; and a buffer joint fitted at an axial end portion of the output shaft and formed by coupling an output-side yoke member and a cup member via an elastic member, wherein the output shaft and the cup member are provided with a pentrating portion through which the coupling shaft is capable of penetrating in the axial direction.

In accordance with a sixth aspect of the present invention, there is provided an intermediate shaft apparatus of a steering shaft assembly, comprising: an input shaft; an output shaft fixed to the input shaft in a circumferential direction and arranged to be slidable relative to the input shaft in an axial direction only during application of an impact thereto; and a buffer joint fitted at an axial end portion of the output shaft and formed by coupling an output-side yoke member and a cup member via an elastic member, wherein the output shaft and the cup member are provided with a penetrating portion through which the input shaft is capable of penetrating in the axial direction.

In accordance with a seventh aspect of the present invention, in the intermediate shaft apparatus of a steering shaft assembly according to any one of third to sixth aspects of the invention, the elastic member is provided between an inner ring and an outer ring, and the inner ring, the elastic member, and the outer ring are integrally formed as a collar member.

In accordance with the above-described aspects of the present invention, it is possible to provide an intermediate shaft apparatus of a steering shaft assembly which is capable of securing a large impact-absorbing stroke and improving its assembling efficiency, and which is capable of improving the assembling efficiency in combination with a buffer joint, of being readily provided with an impact-absorbing mechanism and a buffer mechanism of a steering shaft in combination in a functional space, and of capable of sufficiently demonstrating its impact-absorbing and buffer functions in its limited space.

The above and other objects, features and advantages of the present invention will become more apparent from the following detailed description of the invention when read in conjunction with the accompanying drawings.

BRIEF DESCRIPTION OF THE DRAWINGS

FIG. 4(A) is a vertical side cross-sectional view of essential portions of the intermediate shaft;

FIG. 4(B) is a vertical side cross-sectional view of the essential portions of the intermediate shaft in a state in which the coupling shaft has penetrated through a penetrating portion;

FIG. 5(A) is a vertical side cross-sectional view of the essential portions of the intermediate shaft in a state in which the coupling shaft has penetrated through the penetrating portion;

FIG. 5(B) is a vertical side cross-sectional view of a state in which the input shaft has slide relative to the coupling shaft in the axial direction and is contracted;

FIG. 8(A) is a schematic diagram illustrating a process of assembling the intermediate shaft;

FIG. 8(B) is a schematic diagram illustrating the process of assembling the intermediate shaft;

FIG. 9(A) is a vertical side cross-sectional view of a second embodiment of the present invention;

FIG. 9(B) is a vertical side cross-sectional view of a third embodiment of the present invention;

FIG. 11 is a vertical side cross-sectional view of a fifth embodiment of the present invention.

DESCRIPTION OF THE PREFERRED EMBODIMENTS

Referring now to the accompanying drawings, a description will be given of the preferred embodiments of the present invention. First, a description will be given of a first embodiment of the present invention.

Figure 1:
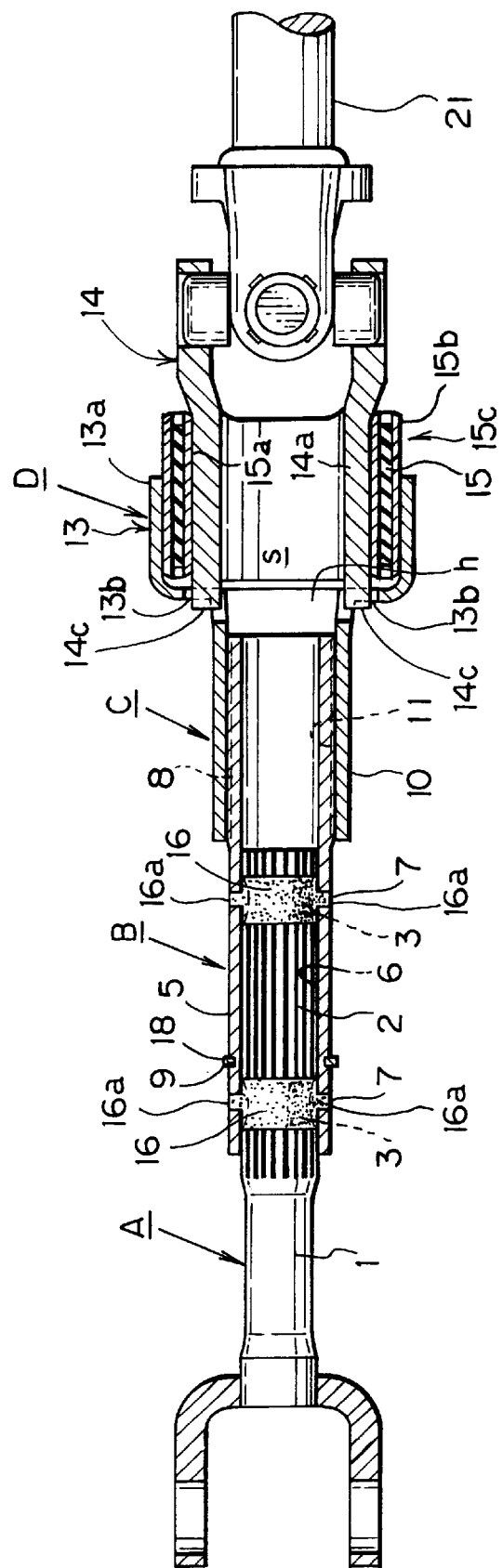
FIG. 1 is a vertical side cross-sectional view of an intermediate shaft in accordance with a first embodiment of the present invention.
Figure 6:
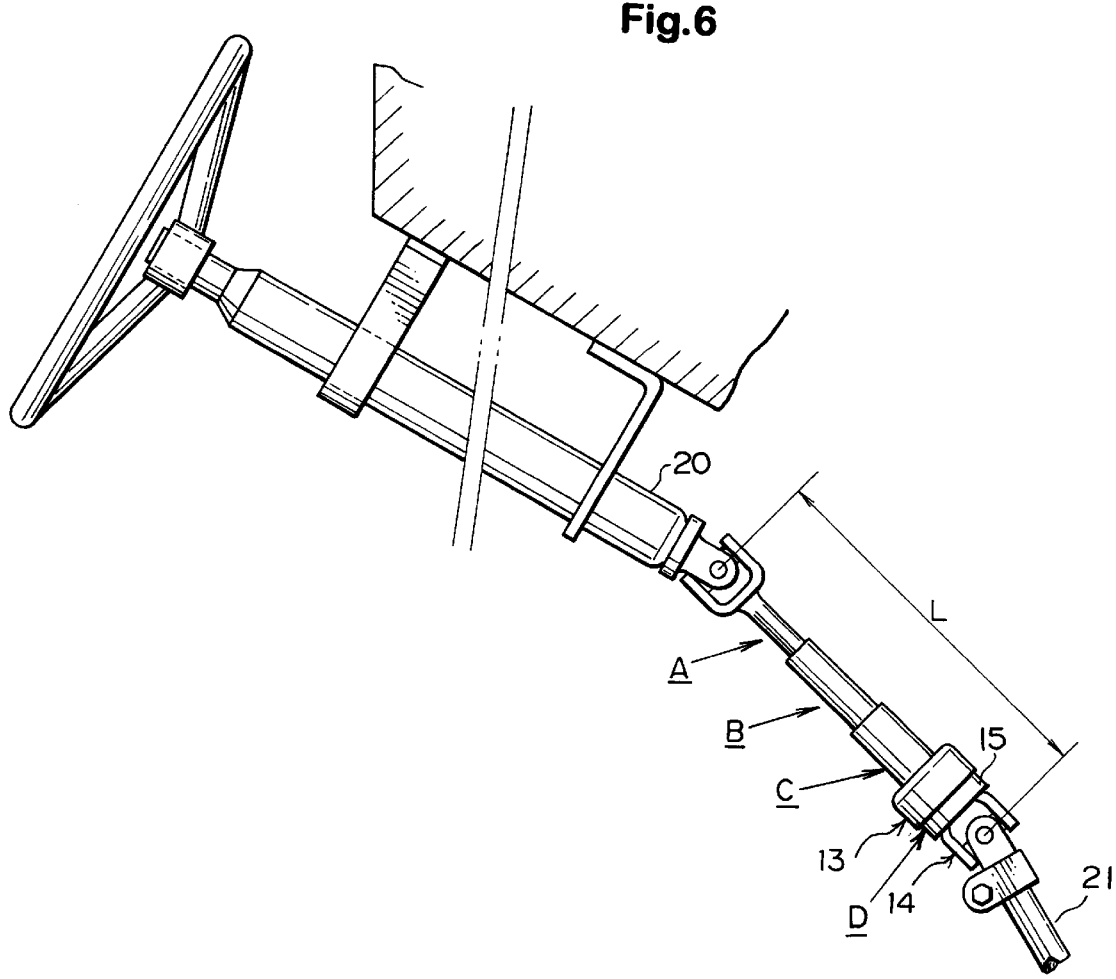
FIG. 6 is a schematic diagram illustrating a state in which the intermediate shaft is fitted to a steering wheel shaft and a steering gear shaft.

As shown in FIG. 1, the intermediate shaft in terms of its main structure in accordance with the present invention is comprised of an input shaft A, an output shaft C, and a coupling shaft B. The input shaft A is coupled to a steering wheel shaft by means of a joint (see FIG. 6).

Meanwhile, the output shaft C is coupled to the steering gear side by means of a joint. The input shaft A and the coupling shaft B are slidable with respect to each other in an axial direction, and are fixed in a circumferential direction.

To illustrate one example of a structure for coupling the input shaft A and the coupling shaft B, as shown in FIGS. 1, 2(A), 2(B), and 4(A), a splined structure is adopted in which an outer periphery of the input shaft A and an inner periphery of the coupling shaft B are spline-fitted to each other.

Specifically, input-shaft outer splines 2 are formed on one axial side portion of an input shaft portion 1 of the input shaft A. Two injection grooves 3 are formed in the splined portion of the input shaft portion 1. Meanwhile, coupling-shaft inner splines 6 are formed on an inner periphery of a tubular member 5 of the coupling shaft B.

The input shaft A and the coupling shaft B are fixed to each other in the axial direction by means of resin-injected fixing members 16 so as to set a predetermined length as the coupled length of the input shaft A and the coupling shaft B. The arrangement provided is such that when a predetermined impact load or more is applied to the intermediate shaft in its axial direction, shear pin portions 16a of the resin-injected fixing members 16 are sheared and fractured, thereby allowing the input shaft A and the coupling shaft B to telescopically contract relative to each other.

Figure 2:
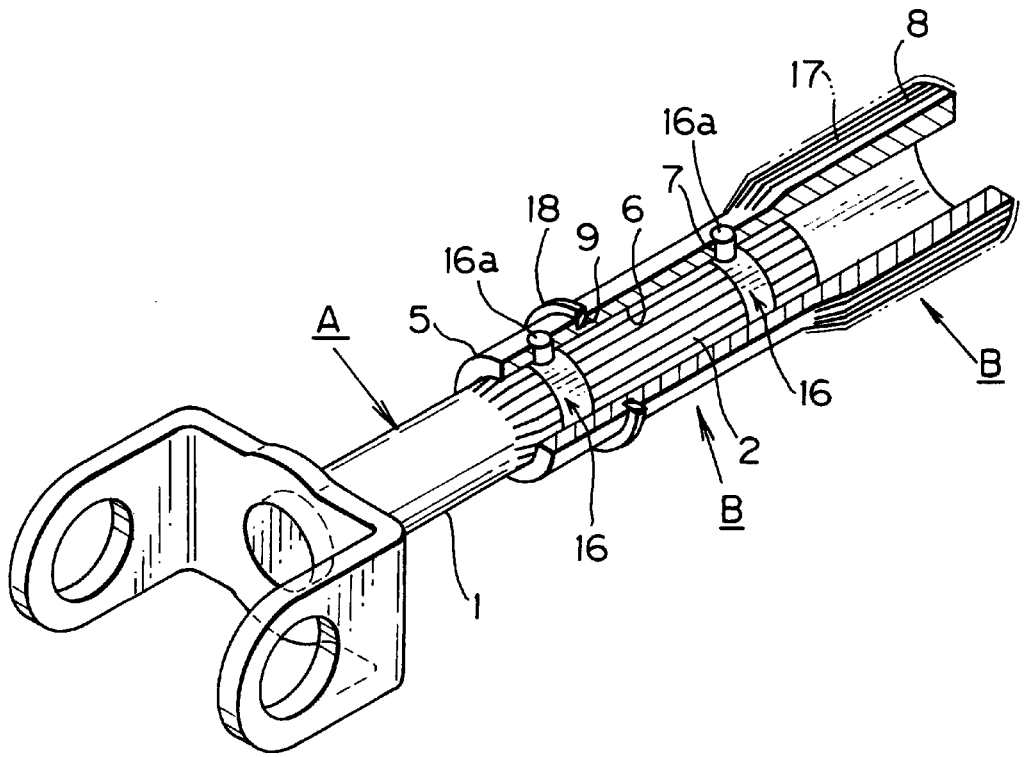
FIG. 2(A) is a perspective view of an input shaft and a coupling shaft.
FIG. 2(B) is a vertical side cross-sectional view of the input shaft and the coupling shaft.
Figure 2:
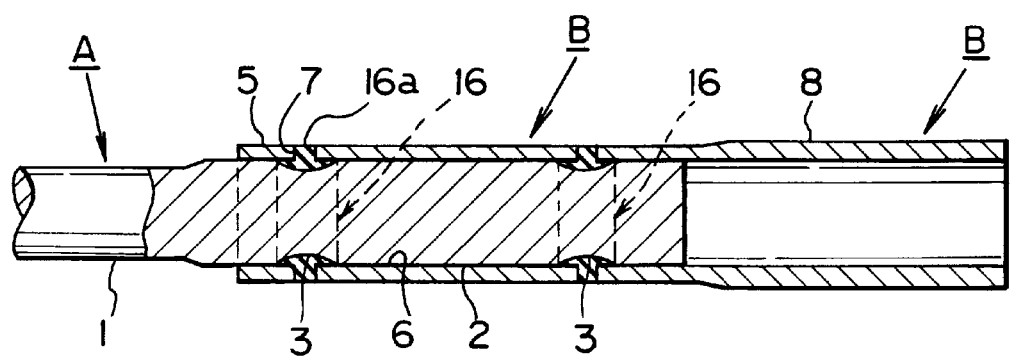

As shown in FIGS. 2(A) and 2(B), resin injection holes 7 are formed in the coupling shaft B. A molten resin is injected through the resin injection holes 7, and after the resin in cured, the resin-injected fixing members 16 are thereby formed. The portions of the cured resin which remain in the resin injection holes 7 constitute the shear pin portions 16a.

As shown in FIG. 2(A), a coupling-shaft outer splines 8 are formed on one axial side portion of the tubular member 5 of the coupling shaft B. Further, an annular groove 9 for a stopper ring 18 is formed on an axial side portion of the tubular member 5 which is opposite to the side portion where the coupling-shaft outer splines 8 are formed. The stopper ring 8 can be fitted and fixed in the annular groove 9.

Figure 3:
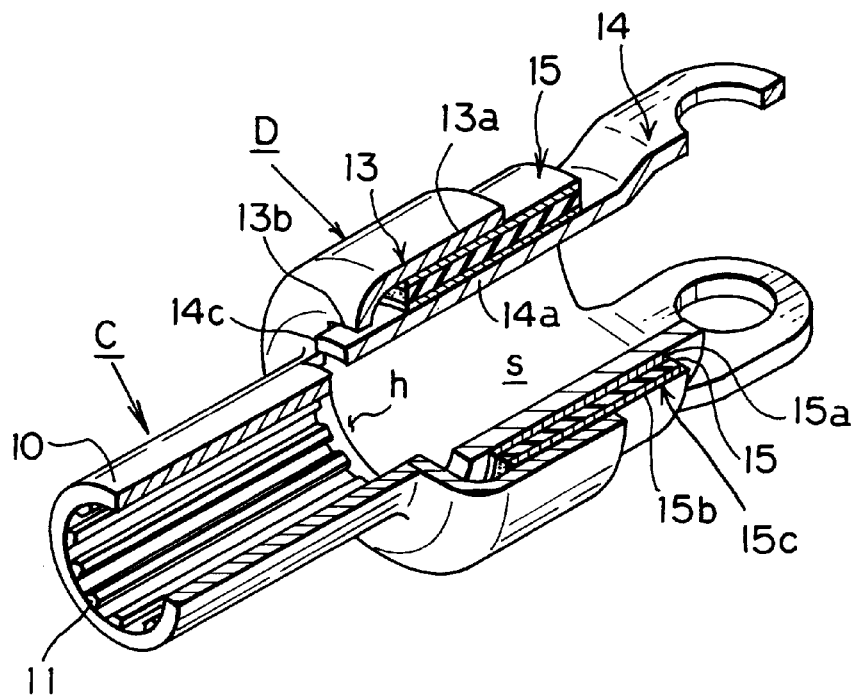
FIG. 3(A) is a perspective view of the coupling shaft and an output shaft.
FIG. 3(B) is a vertical side cross-sectional view of the coupling shaft and the output shaft.
Figure 3:
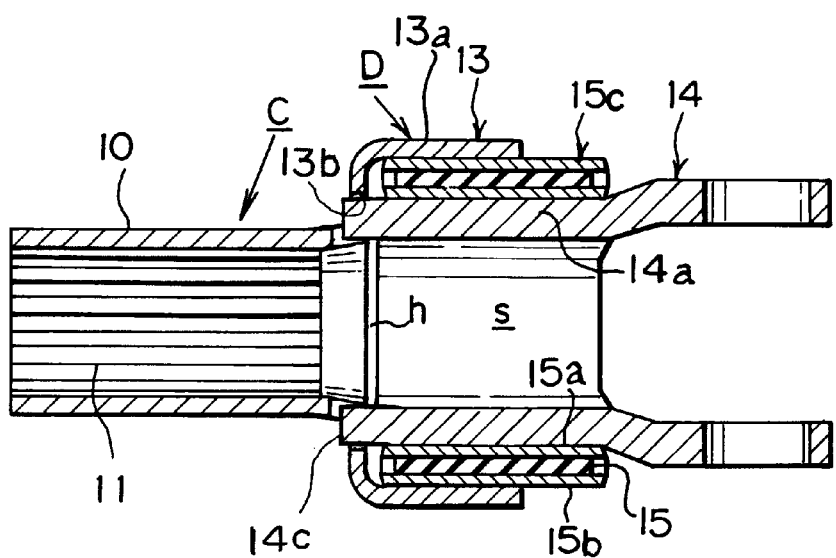

As shown in FIGS. 1, 3(A), and 3(B), output-shaft inner splines 11 are formed on an inner periphery of a tubular body 10 of the output shaft C, and the coupling-shaft outer splines 8 of the coupling shaft B mesh with the output-shaft inner splines 11. The arrangement provided is such that when a predetermined load or more is applied to the intermediate shaft, the output shaft C and the coupling shaft B contract in the axial direction relative to each other.

In the structure for coupling the coupling shaft B and the output shaft C, the resin-injected fixing members 16 used in the structure for coupling the input shaft A and the coupling shaft B are not present. Therefore, even if an impact load is not specially applied to the coupling shaft B and the output shaft C, the coupling shaft B and the output shaft C can be extended or retracted in the axial direction by the operation of an operator.

A structure is adopted for providing appropriate sliding resistance in the extending and contracting operation of the coupling shaft B and the output shaft C in the axial direction. Specific examples thereof are shown below.

First, a resin coating 17 is provided on the surface of the coupling-shaft outer splines 8 of the coupling shaft B, so that sliding resistance can occur between the coupling-shaft outer splines 8 and the output-shaft inner splines 11 by means of the resin coating 17 (see FIG. 2(A)).

Alternatively, it is possible to adopt a structure in which an appropriate portion of the output shaft C is worked from the outside by calking means so as to slightly reduce the cross-sectional shape of the output shaft C, such that the friction between the coupling-shaft outer splines 8 and the output-shaft inner splines 11 becomes large, thereby allowing appropriate sliding resistance to occur in the relative sliding of the coupling shaft B and the output shaft C.

By adopting the above-described structures, the input shaft A and the coupling shaft B can be fixed to each other by the shear pin portions 16a using the injected resin, while the coupling shaft B and the output shaft C are spline-coupled to each other, and frictional resistance is allowed to take place by means of the resin coating 17 or calking so as to fix the two members in a telescopically fitted state. Thus, even in a limited space, by extending or contracting the spline-fitted section during assembly, it is possible to temporarily adjust the axial length of the intermediate shaft, as required, thereby facilitating the assembly.

A buffer joint D is provided at one axial end of the output shaft C. In terms of the structure of the buffer joint D, a through hole is formed in a bottom portion of a cup member 13, and an insertion portion 14a of an output-side yoke member 14 is fitted on an inner side of the cup member 13 via an elastic member 15.

A shown in FIGS. 3(A) and 3(B), the interior of the insertion portion 14a is made hollow, and this hollow space will be referred to as an accommodating space s. The tubular body 10 of the output shaft C is secured in the through hole portion of the cup member 13, and the tubular body 10 and the through hole portion of the cup member 13 constitute a penetrating portion h which penetrates in the axial direction.

The arrangement provided is such that when an impact load in the axial direction is applied to the intermediate shaft due to an impact occurring during a collision of a vehicle, and contacts in the axial direction, the coupling shaft B slides in the axial direction relative to the output shaft C, and the coupling shaft B directly passes through the penetrating portion h and enters the accommodating space s (see FIGS. 4(A) and 4(B)).

As mentioned above, the elastic member 15 is fitted between the cup member 13 and the insertion portion 14a of the output-side yoke member 14. Specifically, the elastic member 15 is fitted between an outer ring 15(B) and an inner ring 15a as shown in FIGS. 3(A) and 3(B), and these members are formed integrally as a collar member 15c.

An outer peripheral surface of the outer ring 15(B) is press-fitted to an inner peripheral surface of the cup member 13, and the insertion portion 14a of the output-side yoke member 14 is press-fitted an inner peripheral surface of the inner ring 15a.

As described above, the collar member 15c can be assembled easily to the cup member 13 by means of press fitting. Additionally, the collar member 15c prevents possible damage to the elastic member 15 during assembly, and is capable of favorably buffering an impact.

Next, the elastic member 15 may be secured directly to either one of the cup member 13 and the output-side yoke member 14, or may be fitted between the cup member 13 and the output-side yoke member 14 via a ring member.

A rotation-restricting cut hole 13b is formed in a cup body 13a of the cup member 13, while a rotation-restricting projection 14c is formed on the insertion portion 14a of the output-side yoke member 14. The rotation-restricting projection 14c is loosely inserted in the rotation-restricting cut hole 13b.

In the event that an external load is applied to the steering gear apparatus, and a torsion of a fixed level or more occurs to the elastic member 15, a rotational phase difference occurs between the output-side yoke member 14 and the cup member 13. In such a case, the rotation-restricting cut hole 13b is caught by the rotation-restricting projection 14c so as to prevent the twisting of the elastic member 15(B)y a predetermined angle, thereby permitting the steering.

In the first embodiment, since the above-described structure is adopted, it is possible to improve the efficiency for assembling the intermediate shaft onto relevant components of the vehicle, and provide a very large contractible range at the time of absorbing an impact during a collision of the vehicle.

Namely, in the absorption of the impact during the collision of the vehicle, the input shaft A and the coupling shaft B undergo contraction, and the coupling shaft B and the output shaft C additionally undergo contraction. At the same time, the coupling shaft B with the input shaft A fitted therein is capable of passing through the penetrating portion h and reaching the interior of the buffer joint D. For this reason, it is possible to obtain a very large contracting stroke in the absorption of the impact.

Next, in accordance with a second embodiment of the present invention, as shown in FIG. 9(A), the intermediate shaft is comprised of the input shaft A, the coupling shaft B, the output shaft C, and the cup member 13, and the penetrating portion h is not present between the output shaft C and the cup member 13.

In the second embodiment, the coupling shaft B is extended or contracted within the axial length of the output shaft C, and the intermediate shaft can be set to a length which is suitable for assembly onto the vehicle. Thus, the efficiency for assembling the intermediate shaft onto the relevant components of the vehicle can be improved, and the impact occurring during a collision of the vehicle can be absorbed very favorably.

Namely, the operation of assembling the intermediate shaft can be effected by sliding the coupling shaft B and the output shaft C in the axial direction. In addition, in the absorption of the impact occurring during a collision of the vehicle, the input shaft A and the coupling shaft B undergo contraction, and the coupling shaft B and the output shaft C additionally undergo contraction, thereby making it possible to obtain a sufficient contracting stroke.

Next, in accordance with a third embodiment of the present invention, as shown in FIG. 9(B), the intermediate shaft is not provided with the coupling shaft B, and is comprised of the input shaft A, the output shaft C, and the cup member 13. The input shaft A is fixed to the output shaft C in the circumferential direction, and is made slidable in the axial direction.

The output shaft C and the cup member 13 are provided with the penetrating portion h through which the input shaft A is capable of penetrating in the axial direction. By providing such a construction, it is possible to efficiently effect the operation of assembly onto the relevant components of the vehicle.

Namely, since the structure provided is such that the input shaft A and the output shaft C in the intermediate shaft apparatus with the buffer joint D fitted thereto are fixed in the axial direction, and the output shaft c and the input shaft A are relatively slidable in the axial direction, the intermediate shaft allows the axial length of the input shaft A to be adjusted easily by means of the penetrating portion h and the space s extending through the buffer joint D during the assembling operation.

Figure 10:
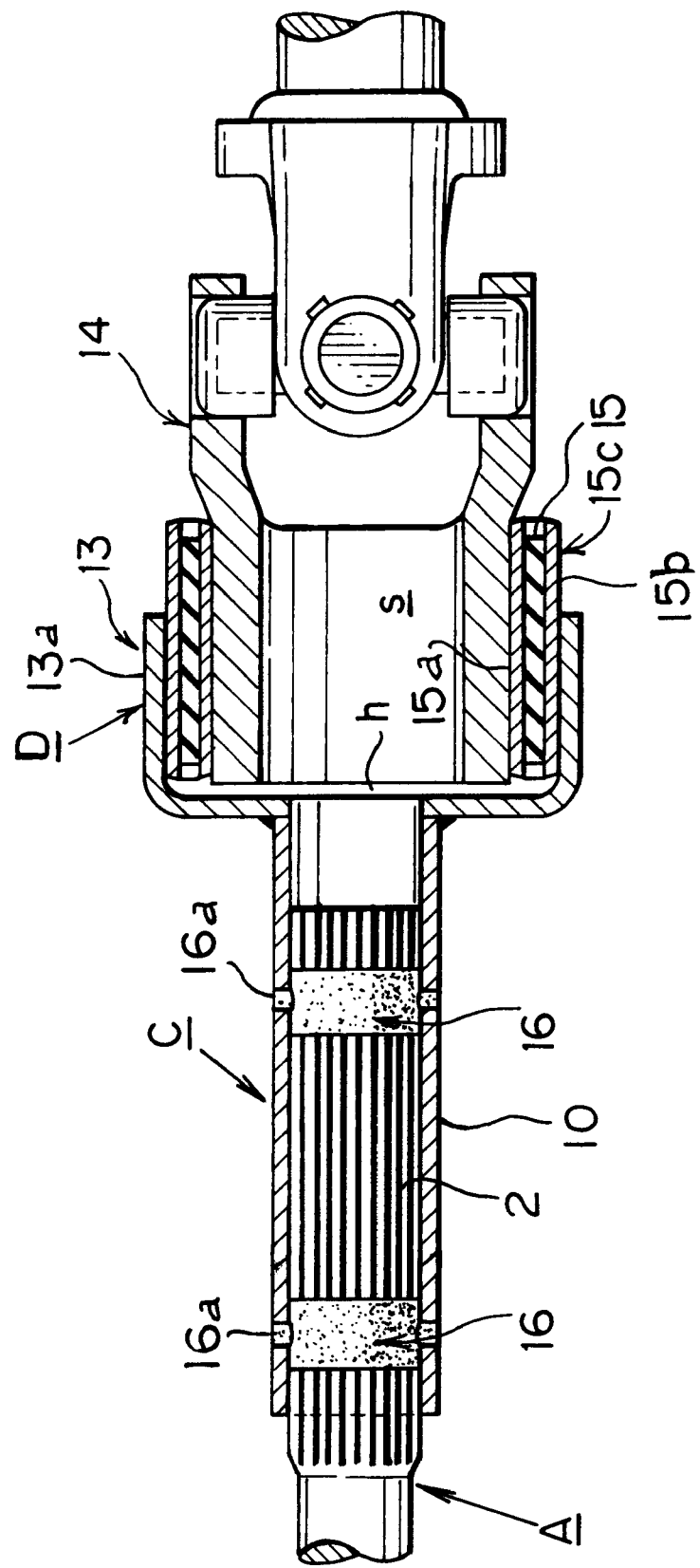
FIG. 10 is a vertical side cross-sectional view of a fourth embodiment of the present invention.

Next, in accordance with a fourth embodiment of the present invention, as shown in FIG. 10, the intermediate shaft is not provided with the coupling shaft B, and is comprised of the input shaft A, the output shaft C, and the cup member 13. The input shaft A is fixed to the output shaft C in the circumferential direction, and the output shaft C is slidable relative to the input shaft A in the axial direction, but the intermediate shaft is made contractible in the axial direction only during application of an impact by means of the resin-injected fixing members 16. The output shaft C and the cup member 13 are provided with the penetrating portion h through which the input shaft A is capable of penetrating in the axial direction.

In this embodiment, since the above-described arrangement is provided, the length of a coupling portion between the input shaft A and the output shaft C in the axial direction can be set appropriately, and the input shaft A and the output shaft C can be secured by means of the resin-injected fixing members 16.

In addition, the contracting stroke during the absorption of the impact is not derived from the length of the coupling portion, and the length of the stroke can be obtained including the accommodating space s within the buffer joint D.

Further, if the intermediate shaft is combined with an elastic shaft coupling, the intermediate shaft can be made compact in its axial direction, and the assembly can be facilitated, making it possible to improve the assembling efficiency.

Next, in accordance with a fifth aspect of the present invention, as shown in FIG. 11, the input shaft A is fixed to the coupling shaft B, which in turn is fixed to the output shaft C. The output-side yoke member 14 is directly secured to the output shaft C. In this embodiment, the penetrating portion h and the accommodating space s in the output-side yoke member 14 are not present.

In this embodiment, since the structure provided is such that the coupling shaft B and the output shaft C are slidable relative to each other in the axial direction, the intermediate shaft makes it possible to easily effect the adjustment of its axial length, thereby making it possible to efficiently effect the operation of assembling the intermediate shaft onto the relevant components of the vehicle. At the same time, the input shaft A is slidable relative to the coupling shaft B in the axial direction only during application of an impact, the impact occurring during a collision can be absorbed.

Next, a description will be given of the operation in accordance with the present invention. First, the intermediate shaft is structured such that the input shaft A and the coupling shaft B are fixed in the circumferential direction, and the input shaft A and the coupling shaft B are made slidable relative to each other in the axial direction only during application of an impact. In addition, the coupling shaft B and the output shaft C are fixed in the circumferential direction, and are made slidable relative to each other in the axial direction.

The cup member 13 is fitted to the axial end portion of the output shaft C and is integrally provided with the output-side yoke member 14, and the output shaft C and the cup member 13 is provided with the penetrating portion h through which the coupling shaft B is capable of penetrating.

Accordingly, when effecting the operation of assembling the intermediate shaft between a steering wheel shaft 20 and a steering gear shaft 21, as shown in FIG. 8(A), the intermediate shaft is first made to contract at the coupling portion between the coupling shaft B and the output shaft C, so as to temporarily shorten the axial length of the intermediate shaft.

Next, one axial end of the intermediate shaft is coupled to the steering wheel shaft 20, and the other axial end of the intermediate shaft is adjusted to the position of the steering gear shaft 21. Then, the intermediate shaft is extended in the axial direction at the coupling portion between the coupling shaft b and the output shaft C, and is coupled to the steering gear shaft 21.

Figure 7:
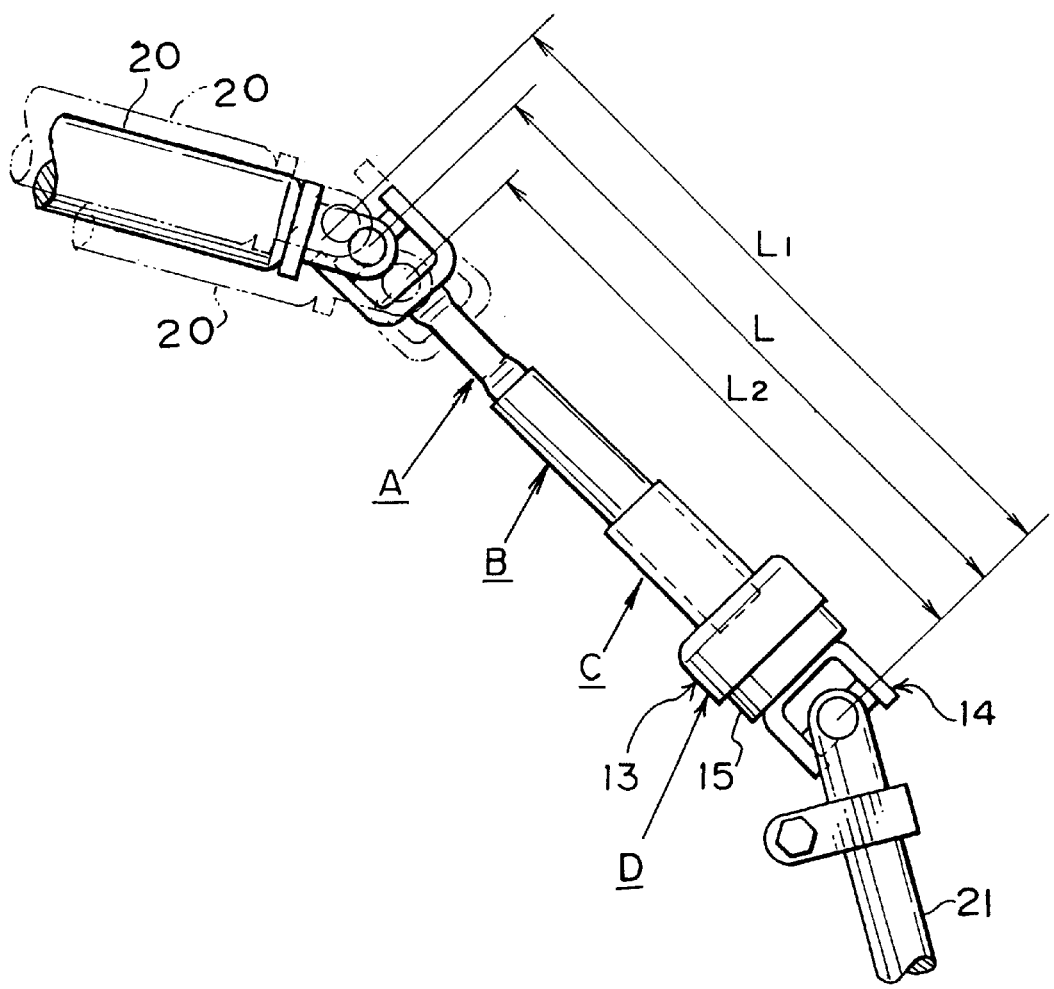
FIG. 7 is a schematic diagram illustrating in exaggerated form variations of an interval between the steering wheel shaft and the steering gear shaft.

In practice, as an interval between the steering wheel shaft 20 and the steering gear shaft 21 which are mounted in an actual vehicle, there can be slight variations in the installation dimension such as L, L1, and L2, as shown in FIG. 7. However, by causing the coupling portion between the coupling shaft B and the output shaft C of the intermediate shaft to extend or contract, it is possible to favorably cope with such variations in the installation dimension.

In addition, in a case where the intermediate shaft contracts due to an impact of a collision of the vehicle, the contraction first starts to take place at the coupling portion between the coupling shaft B and the output shaft C, and the coupling shaft B penetrates the penetrating portion h and advances into the accommodating space s (see FIG. 5(A)).

At this time, the stopper ring 18 provided on the coupling shaft B abuts against an axial end of the output shaft C, and is capable of restricting the amount of contraction. Then, although the coupling shaft B and the input shaft portion 1 are secured to each other by the resin-injected fixing members 16, the sheer pin portions 16a of the resin-injected fixing member 16 are subjected to shear fracture, and the input shaft A slides in the coupling shaft B in the axial direction, thereby completing the contraction (see FIG. 5(B)).

What is claimed is:

1. An intermediate shaft apparatus of a steering shaft assembly, comprising:

an input shaft;

a coupling shaft fixed to said input shaft in a circumferential direction and arranged to be slidable relative to said input shaft in an axial direction only during application of a predetermined impact force thereto;

an output shaft fixed to said coupling shaft in the circumferential direction and only by means of friction derived from fitting together of said shafts in the axial direction; said output shaft being telescopically movable relative to the coupling shaft in the axial direction; and an output-side yoke member provided at an axial end portion of said output shaft.

2. An intermediate shaft apparatus of a steering shaft assembly, comprising:

an input shaft;

a coupling shaft fixed to said input shaft in a axial direction via a resin-injected fixing member and arranged to be telescopically movable relative to said input shaft in the axial direction only during application of a predetermined impact force thereto;

an output shaft operatively engaged to said coupling shaft only by means of friction derived from fitting together of said shafts, said output shaft being slidable relative to the coupling shaft in the axial direction; and an output-side yoke member provided at an axial end portion of said output shaft.

* * * * *